(12) United States Patent
Nguyen et al.

(10) Patent No.: US 8,145,738 B2
(45) Date of Patent: Mar. 27, 2012

(54) METHOD AND APPARATUS FOR MANAGING A NETWORK

(75) Inventors: Nam Nguyen, Sa Jose, CA (US); James Forsyth, Royal Oak, MI (US); Paul A. Tomalenas, Alamo, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 786 days.

(21) Appl. No.: 11/749,035

(22) Filed: May 15, 2007

(65) Prior Publication Data

US 2008/0288619 A1 Nov. 20, 2008

(51) Int. Cl.
*G06F 15/173* (2006.01)
*G06F 15/177* (2006.01)
*G06F 7/00* (2006.01)

(52) U.S. Cl. .................... 709/223; 709/220; 707/705

(58) Field of Classification Search ................ None
See application file for complete search history.

(56) References Cited

U.S. PATENT DOCUMENTS

| | | | |
|---|---|---|---|
| 6,490,574 B1 * | 12/2002 | Bennett et al. | 706/47 |
| 6,539,425 B1 * | 3/2003 | Stevens et al. | 709/220 |
| 6,578,076 B1 * | 6/2003 | Putzolu | 709/223 |
| 6,769,024 B1 | 7/2004 | Natarajan et al. | |
| 7,275,104 B1 * | 9/2007 | Martinez et al. | 709/224 |
| 7,343,364 B2 * | 3/2008 | Bram et al. | 706/47 |
| 2003/0110397 A1 * | 6/2003 | Supramaniam et al. | 713/201 |
| 2005/0027837 A1 | 2/2005 | Roese et al. | |
| 2006/0259949 A1 * | 11/2006 | Schaefer et al. | 726/1 |

* cited by examiner

*Primary Examiner* — Wen-Tai Lin
(74) *Attorney, Agent, or Firm* — Guntin Meles & Gust, PLC; Andrew Gust

(57) ABSTRACT

A method and apparatus for managing a network is disclosed. A system that incorporates teachings of the present disclosure may include, for example, a network device having a controller element to modify a communication parameter of the network device based on a policy of the communication system, wherein the policy is generated based at least in part on a client request to modify the communication system and a policy template retrieved according to a policy identification communicated over the Internet by an operations support system. Additional embodiments are disclosed.

24 Claims, 5 Drawing Sheets

200

METHOD AND APPARATUS FOR MANAGING A NETWORK

FIELD OF THE DISCLOSURE

The present disclosure relates generally to communication systems, and more specifically to a method and apparatus for managing a network.

BACKGROUND

A network build-out is generally a one time event, where network policies are manually created and loaded into operations support system instances. The network policies are static unless there are changes to the network infrastructure in which case policies have to be manually updated. This is an inefficient process. During the network build-out, a mapping table of business triggers to policies is manually created and loaded into the policy manager's internal database. The mapping table is also static and is not changed unless there are changes to the network configurations or business service rules. Such changes are a tedious process and error-prone. The policies and mapping tables generated by this process becomes less efficient as the network evolves and expands, and as new business requirements or rules are issued for the network.

A need therefore arises for a method and apparatus for managing a network.

DETAILED DESCRIPTION

Embodiments in accordance with the present disclosure provide a method and apparatus for managing a network.

In a first embodiment of the present disclosure, a computer-readable storage medium can have computer instructions for receiving from a client a request to modify the communication system; parsing the request to generate a modification key; retrieving a policy identification based at least in part on the modification key when the policy identification is stored in a cache of the communication system; retrieving the policy identification over the Internet from an operations support system when the policy identification is not stored in the cache of the communication system; retrieving a policy template based on the policy identification; generating a policy based at least in part on the policy template; and communicating the policy to implement a modification of the communication system.

In a second embodiment of the present disclosure, a network device of a communication system can have a controller element to modify a communication parameter of the network device based on a policy of the communication system, wherein the policy is generated based at least in part on a client request to modify the communication system and a policy template retrieved according to a policy identification communicated over the Internet by an operations support system.

In a third embodiment of the present disclosure, a method of managing a network can involve receiving from a client a request to modify the network; retrieving a policy identification based at least in part on the request from at least one of a memory of the network and an operations support system in communication with the network over the Internet; retrieving a policy template based on the policy identification; generating a policy based at least in part on the policy template; and communicating the policy to implement a modification of the network.

Figure 1:
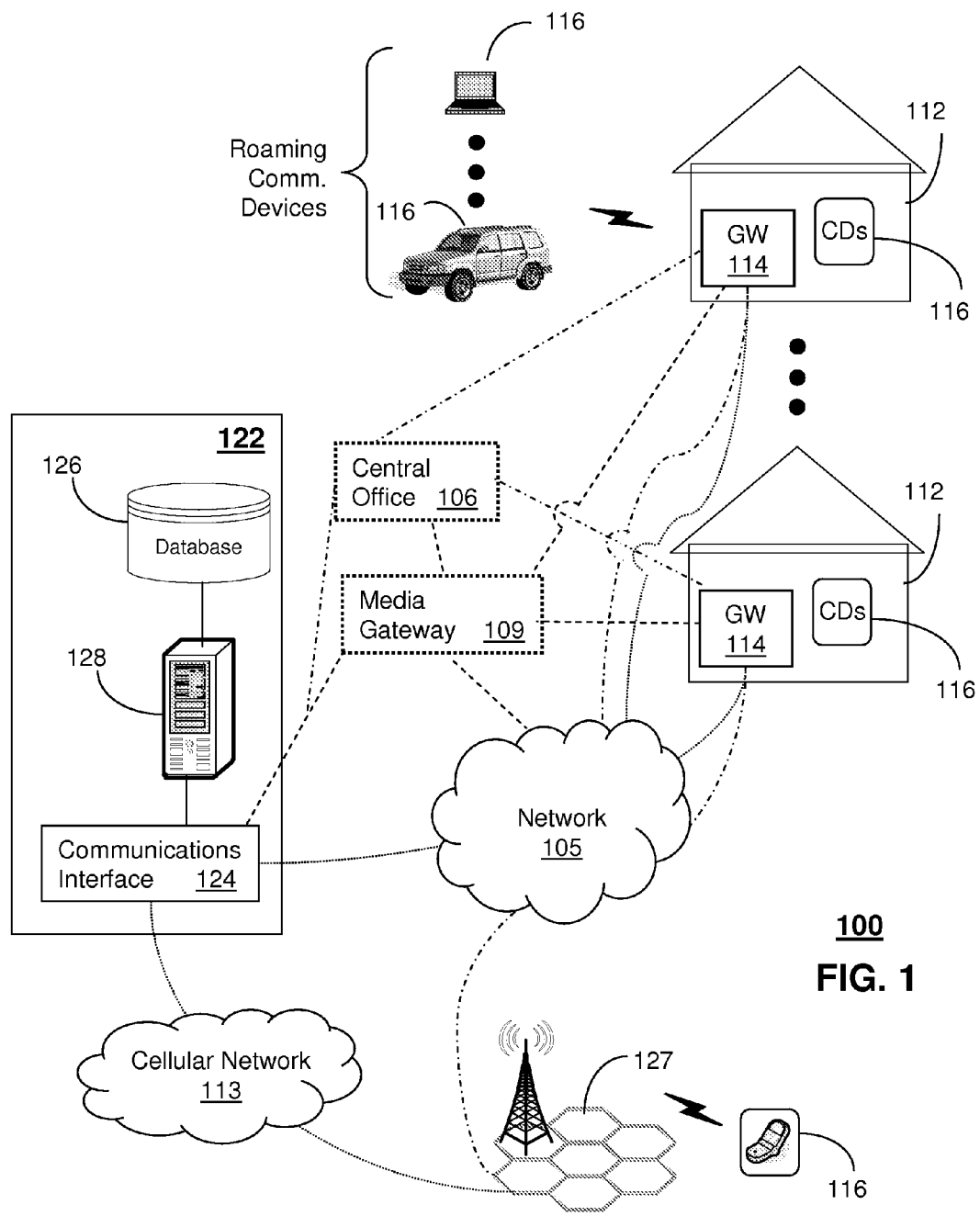
FIGS. 1 and 2 depict exemplary embodiments of a communication system.

FIG. 1 depicts an exemplary embodiment of a mobile communication device 116 communicating by way of wired and/or wireless access points (WAPs) with other communication devices and/or a network proxy 122 which collectively operate in a communication system 100. The communication device 116 can be a multimode VoIP terminal. However, the present disclosure contemplates the use of other types of communication devices, including other types of voice, video and data devices. The communication system 100 can comprise a packet-switched network 105. The packet-switched network can be an Internet Service Provider (ISP) network 105. The network 105 can be coupled to the network proxy 122, a cellular network 113 and network devices or elements, including network devices located in one or more of the buildings 112 representing an enterprise or residence. The ISP network 105 utilizes technology for transporting Internet traffic.

In an enterprise setting, the building 112 can include a gateway 114 that provides voice and/or video connectivity services between communication devices 116, such as VoIP terminals or other forms of communication devices of enterprise personnel. In a residential setting, the building 112 can include a gateway 114 represented by, for example, a residential gateway coupled to central office 106 utilizing conventional telephonic switching for processing calls with third parties.

The network proxy 122 can be used to control operations of a media gateway 109, the central office 106, and/or the gateway 114. Communications between the network proxy 122, the communication devices 116 and other network devices of the communication system 100 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 122 can comprise a communications interface 124 that utilizes common technology for communicating over an IP interface with the network 105, the central office 106, the media gateway 109, the cellular network 113, and/or the gateway 114. By way of the communications interface 124, the network proxy 122 can direct by common means any of the foregoing network devices to establish packet switched data, voice, and/or video connections between communication devices 116 distributed throughout the communication system 100. The network proxy 122 can further comprise a memory 126 (such as a high capacity storage medium) embodied in this illustration as a database, and a controller 128 that makes use of computing technology such as a desktop computer, or scalable server for controlling operations of the network proxy 122. The network proxy 122 can operate as an IP Multimedia Subsystem (IMS) conforming in part to protocols defined by standards bodies such as 3GPP (Third Generation Partnership Protocol).

Under the control of the network proxy 122, the media gateway 109 can link packet-switched and circuit-switched technologies such as the cellular network 113 (or central office 106) and the network 105, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The central office 106 can house common network switching equipment for distributing local and long-distance telecommunication services supplied by network 105 to buildings 112 (such as dwellings or commercial enterprises). Telecommunication services of the central office 106 can include traditional POTS (Plain Old Telephone Service) and broadband services such as HDTV, DSL, VoIP (Voice over Internet Protocol), IPTV (Internet Protocol Television), Internet services, and so on. The communication system 100 can utilize common computing and communications technologies to support circuit-switched and/or packet-switched communications, including MPLS.

Communication system 100 can comprise various data switches or other network devices that can manage network traffic to one or more users, such as communication devices 116. The data switches can be various network elements utilized for control of network traffic, including digital subscriber line access multipliers (DSLAMs), routers, and asynchronous transfer mode (ATM) switches.

The cellular network 113 can support voice and data services over a number of access technologies such as GSM-GPRS, EDGE, CDMA-1X, UMTS, WiMAX, software defined radio (SDR), and other known and future technologies. The cellular network 113 can be coupled to base stations 127 under a frequency-reuse plan for communicating over-the-air with roaming VoIP terminals 116.

Figure 2:
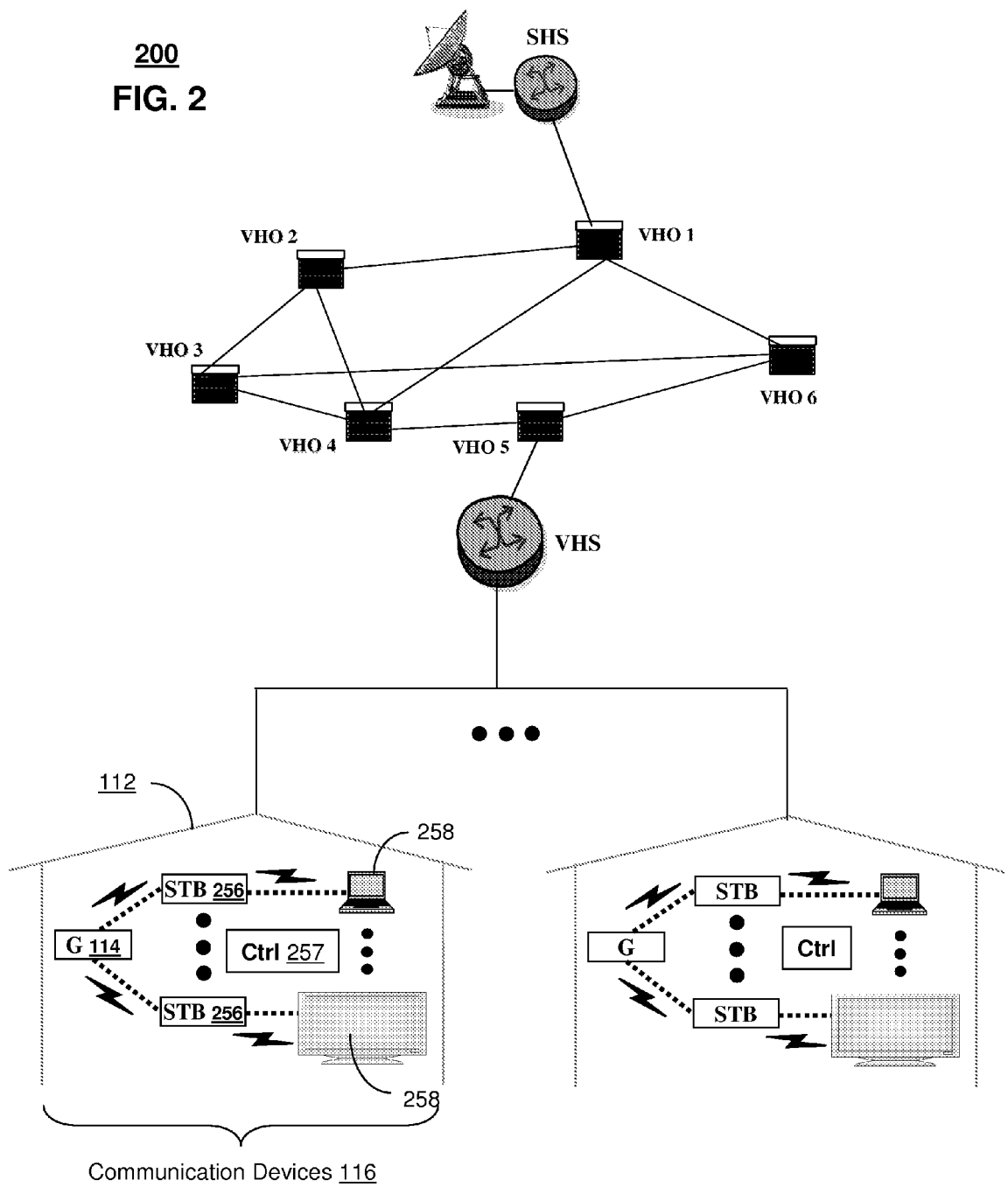

FIG. 2 depicts an exemplary embodiment of a communication system 200 embodying an IPTV service. Communication system 200 can be overlaid or operably coupled with communication system 100 as another representative embodiment of communication system 100. In a typical IPTV backbone, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 112 housing the gateway 114 (e.g., a residential gateway or RG) that distributes broadcast signals to receivers such as Set-Top Boxes (STBs) 256 which in turn present broadcast selections or media programs to media devices 258 such as computers or television units managed in some instances by a media controller 257 (e.g., an infrared or RF remote control).

Unicast traffic can also be exchanged between the STBs 256 and the subsystems of the IPTV communication system 200 for services such as video-on-demand (VoD). Although not shown, the aforementioned multimedia system can also be combined with analog broadcast distributions systems.

Figure 3:
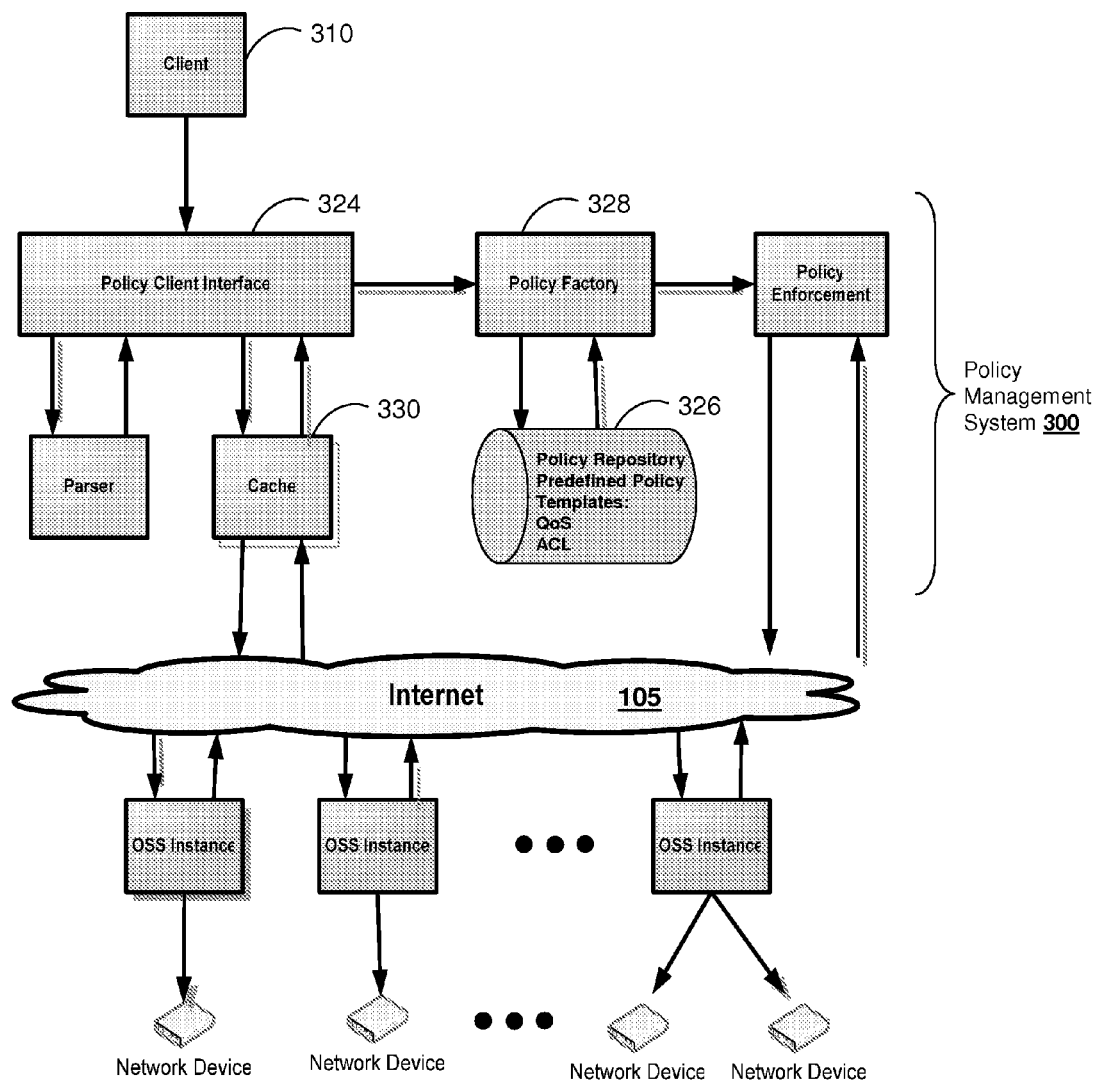
FIG. 3 depicts an exemplary policy management system operating in one or more of the communication systems of FIGS. 1 and 2.

FIG. 3 depicts an exemplary embodiment of a policy management system 300. Policy management system 300 can be overlaid or operably coupled with communication systems 100 and/or 200 as another representative embodiment of the systems. Policy management system 300 can be in communication over the network 105 (e.g., the Internet) with one or more clients 310, one or more operations support systems and one or more network devices (e.g., gateways 114 or communication devices 116 shown in FIGS. 1 and 2). The clients 310 can be various entities and combinations of entities. In one embodiment, clients 310 are subscribers or potential subscribers of the network. In another embodiment, the clients 310 are other service providers and/or government agencies.

The policy management system 300 can comprise a communications interface 324 that utilizes common technology for communicating, such as over an IP interface with the network 105. The policy management system 300 can further comprise a memory 326 (such as a high capacity storage medium) embodied in this illustration as a database, and a controller 328 that makes use of computing technology such as a desktop computer, or scalable server for controlling operations of the policy management system 300 and communications with the clients 310.

The policy management system 300 can further comprise a cache 330 for storage of policy identifications, as will be discussed later in greater detail. The cache 330 can be a memory that is easily accessible by the controller 328 for frequent use. The present disclosure contemplates the cache 330 and the memory 326 being integrated or being separate storage mediums. The policy management system 300 can be a separate sub-system of the communication systems 100 and/or 200, or can be integrated with other features of the systems 100 and/or 200, including being integrated with network proxy 122 and sharing common components therewith.

Figure 4:
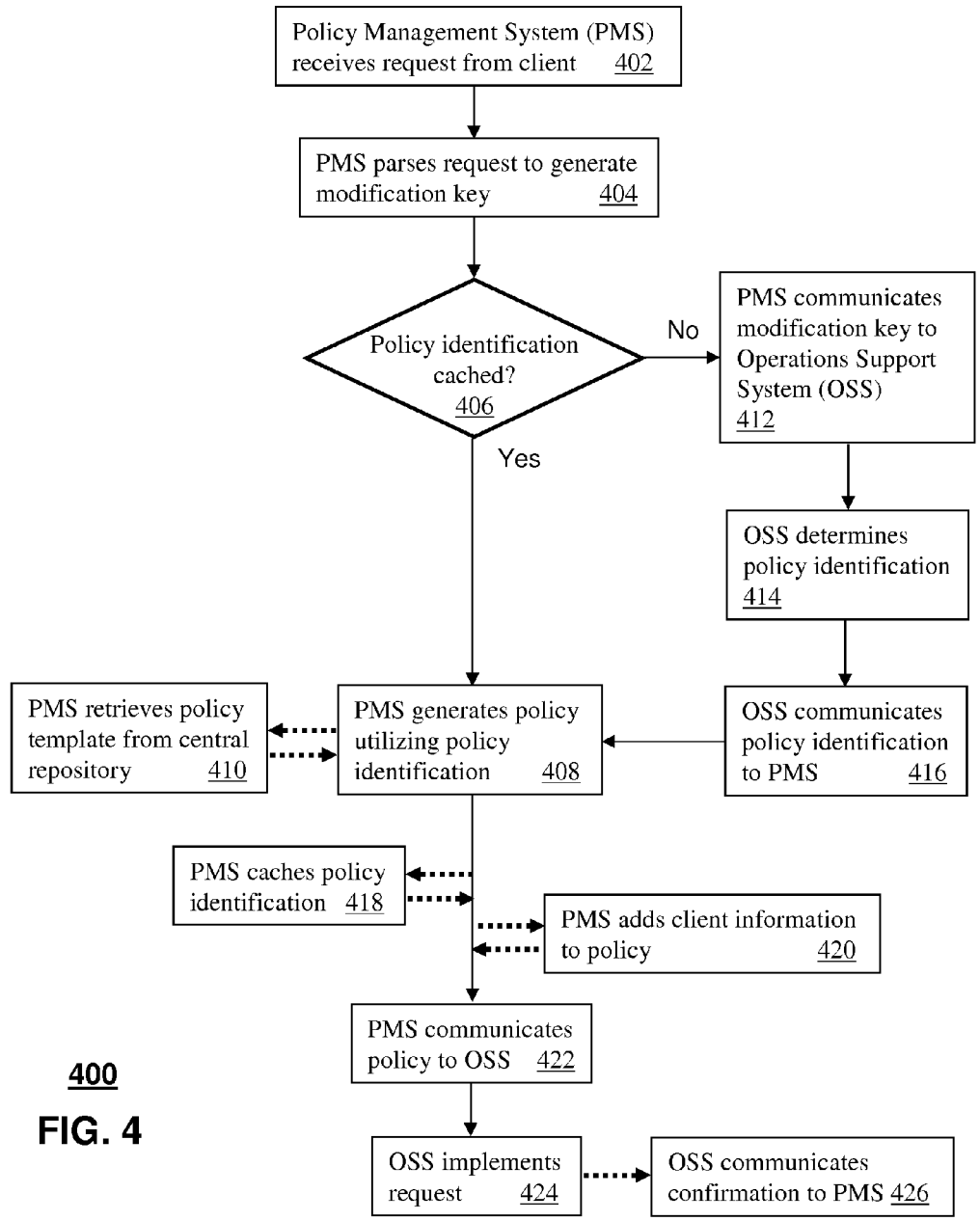
FIG. 4 depicts an exemplary method operating in one or more of the systems of FIGS. 1-3.

FIG. 4 depicts an exemplary method 400 operating in portions of the systems 100, 200 and/or 300. Method 400 has variants as depicted by the dashed lines. It would be apparent to an artisan with ordinary skill in the art that other embodiments not depicted in FIG. 4 are possible without departing from the scope of the claims described below.

Method 400 can begin with step 402 in which the policy management system 300 receives a request from client 310, where the request is associated with the network devices and may result in modification of the network, such as a change to a communication parameter of one or more targeted network devices. The request can be a business trigger from a user or potential user. In another embodiment, the request can come from another entity, including a regulatory agency, service provisioning sub-system, order management sub-system or other service provider. For example, the client 310 can be a current subscriber who desires to upgrade bandwidth and contacts the service provider to do so. The request can be other triggers including other business transactions, subscriber status changes (e.g., suspended no registration, quota exceeded), network activities (e.g., placing VoIP call, watching Video-on-demand), operator interventions (e.g., security shutdown), network state changes (e.g., failure trigger policy), and so forth.

In step 404, the policy management system 300 can parse the request to generate a modification key, such as through use of a parser. For example, a request such as a service order can be received from client 310 in XML format. The parser can parse the XML formatted request into a modification key which is in a format readily usable by the policy management system 300, such as plain text. The present disclosure also contemplates the request and generated modification key not resulting in any modification of the network devices, such as a request for testing or other non-modifying policies associated with network devices.

In step 406, the policy management system 300 can determine whether there is a policy identification in the cache 330 that corresponds to the modification key. If the policy identification is cached then in step 408 the policy management system 300 can generate a policy based at least in part on the cached policy identification and a policy template. In one embodiment, the policy templates can be stored in the central repository or memory 326, and retrieved by the policy management system 300 based on the policy identification and/or the modification key, as in step 410.

If on the other hand, the policy identification is not cached then in step 412 the policy management system 300 can communicate the modification key to the operations support system. In one embodiment, the policy management system 300 can provide the modification key to an operations support system instance, which can be the installation of a third-party vendor's support system on the network. The present disclosure contemplates a plurality of operations support systems being in communication with the policy management system 300. In one embodiment, an operations support system dispatcher or other control technique can be used to communicate modification keys to particular operations support systems.

The operations support system can determine the policy identification based at least in part on the received modification key in step 414. The use of a policy identification generated by the operations support system can remove or reduce any delays associated with a lack of policy for the particular circumstances being stored by a policy manager. In step 416, the operations support system can communicate the policy identification back to the policy management system 300. The communication between the policy management system 300 and the operations support system can be by various techniques, including over the Internet. In one embodiment, the policy management system 300 can communicate the policy by determining the appropriate operations support system instance's IP address from the modification key and a mapping table. In another embodiment, the modification key can include the appropriate operations support system instance's IP address so that the policy management system 300 does not need to maintain a mapping table.

In one embodiment, the policy management system 300 in step 418 can cache policy identifications received from the operations support system to facilitate access and improve run-time efficiency. In another embodiment, the policy management system 300 in step 420 can add data or other information associated with the client to the policy template as part of generating the policy, such as a client ID or corresponding network device IDs.

In step 422, the policy management system 300 can communicate the policy to the operations support system, such as over the Internet. The operations support system can then implement the received policy in step 424, including modification of one or more targeted network devices, such as activating/deactivating an access point, modifying bandwidth, Quality of Service (QoS) instruction, Access Control List (ACL) instruction, or communication parameter adjustment. The received policy and resulting modification of the network correspond to the client's request. The operations support system can determine if the policy is a new or existing policy so that a creation or modification operation can be performed on the targeted network device(s). The particular modification being implemented can vary, and can include adjusting access to network resources and providing specific network services based on various business rules such as portal redirection with network security, non-SBC CVoIP priority remarking, and so forth. In one embodiment, the operations support system can communicate a confirmation message to the policy management system upon receipt of the policy and/or upon implementation of the policy with respect to the targeted network device(s), as in step 426.

From the foregoing descriptions, it would be evident to an artisan with ordinary skill in the art that the aforementioned embodiments can be modified, reduced, or enhanced without departing from the scope and spirit of the claims described below. For example, the policy management system 300 can communicate with all necessary entities for implementation of a policy. In one instance, the parser can generate different formats of the modification key for different operations support systems that utilize different communication formats. The parser can generate the modification key based upon various formats of the request that are received such as from different clients using different communication formats. As another example, the policy management system 300 can dynamically manage the network at the network configuration level. In one instance, policy templates can be independently generated and stored in the central repository, as well as disseminated to the operations support system instances, at any time. The policy templates can be retrieved from other sources, including distributed repositories. These are but a few examples of the modifications that can be applied to the present disclosure without departing from the scope of the claims. Accordingly, the reader is directed to the claims for a fuller understanding of the breadth and scope of the present disclosure.

Figure 5:
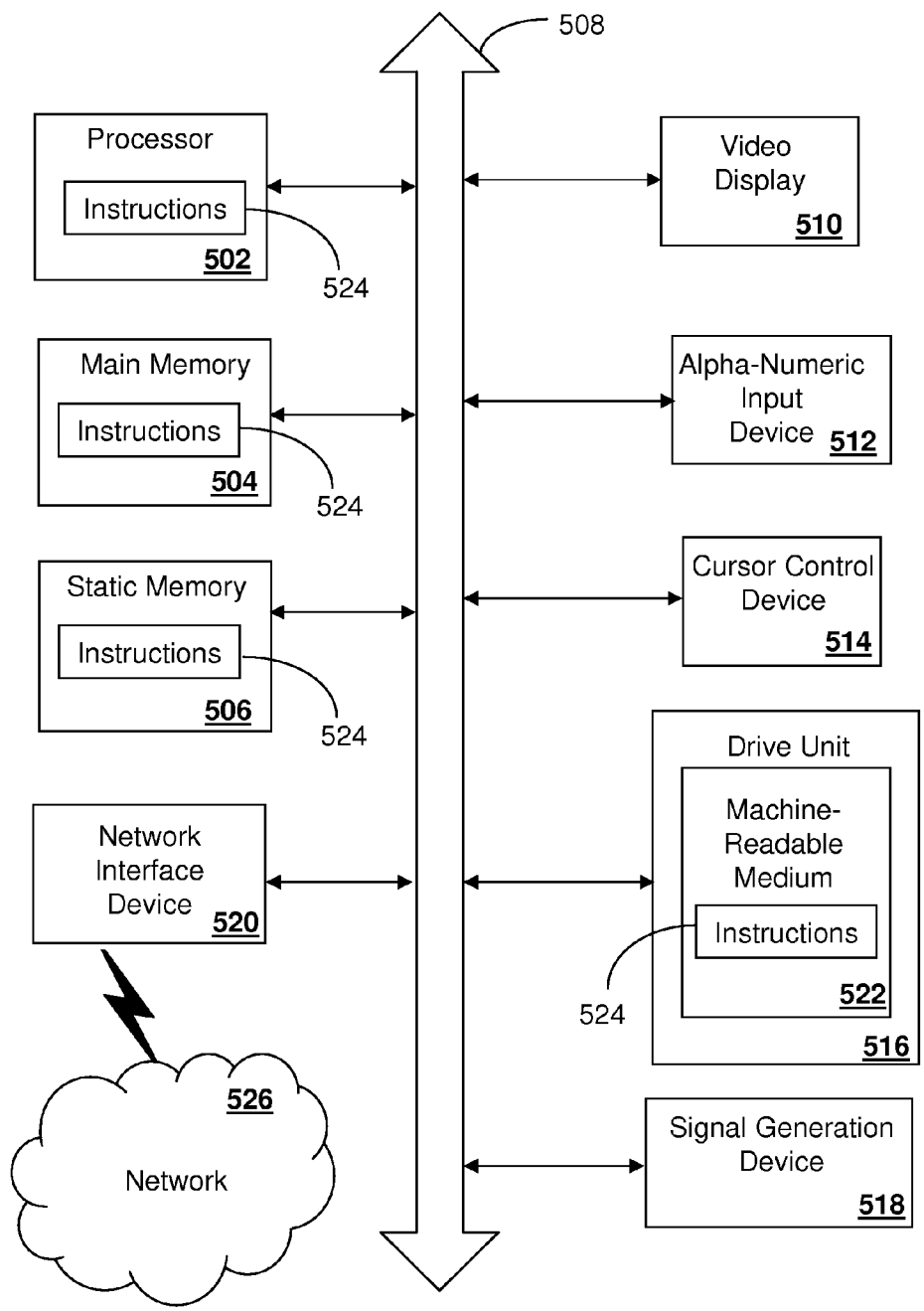
FIG. 5 depicts an exemplary diagrammatic representation of a machine in the form of a computer system within which a set of instructions, when executed, may cause the machine to perform any one or more of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a mass storage medium 516, a signal generation device 518 (e.g., a speaker or remote control) and a network interface device 520.

The mass storage medium 516 may include a computer-readable storage medium 522 on which is stored one or more sets of instructions (e.g., software 524) embodying any one or more of the methodologies or functions described herein, including those methods illustrated above. The computer-readable storage medium 522 can be an electromechanical medium such as a common disk drive, or a mass storage medium with no moving parts such as Flash or like non-volatile memories. The instructions 524 may also reside, completely or at least partially, within the main memory 504, the static memory 506, and/or within the processor 502 during execution thereof by the computer system 500. The main memory 504 and the processor 502 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the computer-readable storage medium 522 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium comprising computer instructions for:

receiving from a client device a request to adjust a service plan for a subscriber of a communication system, wherein the communication system comprises network devices that manage network traffic to a group of client devices of a plurality of subscribers, wherein the group of client devices includes the client device, wherein the client device is associated with the subscriber, and wherein the request is originated at the client device;

parsing the request to generate a modification key;

retrieving a policy identification based at least in part on the modification key when the policy identification is stored in a cache of the communication system;

retrieving the policy identification over the Internet from an operations support system when the policy identification is not stored in the cache of the communication system, wherein the operations support system is identified based on an IP address included in the modification key;

retrieving a policy template based on the policy identification;

generating a new policy based on the policy template and the request for service plan adjustment; and communicating the policy to implement a modification of the communication system.

2. The non-transitory computer-readable storage medium of claim 1, wherein the modification key comprises at least a portion of the request in a different data format, and the network devices comprise data switches.

3. The non-transitory computer-readable storage medium of claim 2, wherein the request is in XML format, and wherein the modification key is a portion of the request in plain text format.

4. The non-transitory computer-readable storage medium of claim 1, wherein the modification comprises at least one among activating an access point, deactivating the access point, modifying bandwidth, a Quality of Service instruction, an Access Control List instruction, or a communication parameter adjustment.

5. The non-transitory computer-readable storage medium of claim 1, wherein the policy is communicated over the Internet to the operations support system to implement the modification of the communication system.

6. The non-transitory computer-readable storage medium of claim 5, comprising computer instructions for receiving a confirmation message over the Internet from the operations support system, wherein the confirmation message indicates at least receipt of the policy.

7. The non-transitory computer-readable storage medium of claim 1, comprising computer instructions for adding client information associated with the client device to the retrieved policy template.

8. A non-transitory computer-readable storage medium comprising computer instructions for:

receiving from a client device a request to adjust a service plan for a subscriber of a communication system, wherein the communication system comprises network devices that manage network traffic to a group of client devices of a plurality of subscribers, wherein the group of client devices includes the client device, wherein the client device is associated with the subscriber, and wherein the request is originated at the client device;

parsing the request to generate a modification key;

retrieving a policy identification based at least in part on the modification key when the policy identification is stored in a cache of the communication system;

retrieving the policy identification over the Internet from an operations support system when the policy identification is not stored in the cache of the communication system, wherein the operations support system is identified based on an IP address included in the modification key;

retrieving a policy template based on the policy identification;

generating a new policy based on the policy template and the request for service plan adjustment;

communicating the policy to implement a modification of the communication system; and confirming receipt of a confirmation message.

9. The non-transitory computer-readable storage medium of claim 1, comprising computer instructions for retrieving the policy template from a centralized repository.

10. A method of managing a network, the method comprising computer implemented steps for:

receiving from a client device a request to modify the network, wherein the client device is associated with one of a regulatory agency or a third party service provider that is not associated with the network;

parsing the request to generate a modification key;

retrieving a policy identification based at least in part on the parsing of the request from at least one of a memory of the network and an operations support system in communication with the network over the Internet;

retrieving a policy template based on the policy identification when the policy identification is cached by a policy management system;

receiving the policy identification from the operations support system at the policy management system when the policy identification is not cached by the policy management system, wherein the operations support system is identified based on an IP address included in the modification key;

generating a new policy based on the policy template and the request for network modification; and communicating the policy to implement a modification of the network.

11. The method of claim 10, wherein the modification comprises at least one among activating an access point, deactivating the access point, modifying bandwidth, a Quality of Service instruction, an Access Control List instruction, and a communication parameter adjustment.

12. The method of claim 10, wherein the modification key comprises at least a portion of the request in a different data format.

13. The method of claim 12, wherein the client request is in XML format, and wherein the modification key is a portion of the request in plain text format.

14. The method of claim 10, wherein the policy is communicated over the Internet to the operations support system to implement the modification of the network.

15. The method of claim 10, comprising receiving a confirmation message over the Internet from the operations support system, wherein the confirmation message indicates at least receipt of the policy.

16. The method of claim 10, comprising adding client information associated with the client device to the retrieved policy template.

17. The method of claim 10, comprising receiving a confirmation message.

18. The method of claim 10, comprising retrieving the policy template from a centralized repository.

19. The non-transitory computer-readable storage medium of claim 8, wherein the modification key comprises at least a portion of the request in a different data format, and the network devices comprise data switches.

20. The non-transitory computer-readable storage medium of claim 19, wherein the request is in XML format, and wherein the modification key is a portion of the request in plain text format.

21. The non-transitory computer-readable storage medium of claim 8, wherein the modification comprises at least one among activating an access point, deactivating the access point, modifying bandwidth, a Quality of Service instruction, an Access Control List instruction, or a communication parameter adjustment.

22. The non-transitory computer-readable storage medium of claim 8, wherein the policy is communicated over the Internet to the operations support system to implement the modification of the communication system.

23. The non-transitory computer-readable storage medium of claim 22, comprising computer instructions for receiving a confirmation message over the Internet from the operations support system, wherein the confirmation message indicates at least receipt of the policy.

24. The non-transitory computer-readable storage medium of claim 8, comprising computer instructions for adding client information associated with the client device to the retrieved policy template.

* * * * *